(12) United States Patent
Kobayashi

(10) Patent No.: US 6,628,601 B1
(45) Date of Patent: Sep. 30, 2003

(54) OPTICAL DISK DRIVE HAVING MAGNETS FOR GENERATING ATTRACTIVE OR REPULSIVE FORCES

(75) Inventor: Hiroki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/495,238

(22) Filed: Jan. 31, 2000

(30) Foreign Application Priority Data

Mar. 30, 1999 (JP) .......................................... 11-089978

(51) Int. Cl.$^7$ .......................... G11B 17/00; G11B 7/085
(52) U.S. Cl. ..................... 369/249; 369/44.22
(58) Field of Search ................................. 369/249, 215, 369/44.22, 219

(56) References Cited

U.S. PATENT DOCUMENTS 5,317,552 A * 5/1994 Yamasaki .................. 359/814

FOREIGN PATENT DOCUMENTS

| JP | 55121430 | 9/1980 |
|---|---|---|
| JP | 55131430 | 9/1980 |
| JP | 57171117 | 10/1982 |
| JP | 1211376 | 8/1989 |
| JP | 2121137 | 5/1990 |
| JP | 2273383 | 11/1990 |
| JP | 35971 | 1/1991 |
| JP | 3113758 | 5/1991 |
| JP | 417129 | 1/1992 |
| JP | 482058 | 3/1992 |
| JP | 482059 | 3/1992 |
| JP | 492058 | 3/1992 |
| JP | 4114372 | 4/1992 |
| JP | 5128622 | 5/1993 |
| JP | 6103586 | 4/1994 |
| JP | 6309724 | 11/1994 |
| JP | 7065514 | 3/1995 |
| JP | 7176100 | 7/1995 |

* cited by examiner

*Primary Examiner*—George J. Letscher
(74) *Attorney, Agent, or Firm*—Greer, Burns & Crain, Ltd.

(57) ABSTRACT

Magnets for seeking provided for the base and magnets for focusing provided for a carriage are so arranged that they are shifted perpendicularly relative to each other. With this arrangement, since the attractive force or the repulsive force, which includes a perpendicular element, is generated between the magnets for seeking and the magnets for focusing, the urging force to the carriage against guide rails can be adjusted.

6 Claims, 3 Drawing Sheets

OPTICAL DISK DRIVE HAVING MAGNETS FOR GENERATING ATTRACTIVE OR REPULSIVE FORCES

BACKGROUND OF THE INVENTION

1. Field of the Invention

The present invention relates to an optical disk drive for optically accessing an optical disk on which information is recorded at least optically, in particular to a drive mechanism for a carriage driver provided for the optical disk drive.

2. Related Arts

In an optical disk drive, a carriage is guided along guide rails on a base to move track crossing direction of the optical disk for guiding a light beam, which is irradiated from a light source, such as a semiconductor laser, to a track on the optical disk through a lens mounted on the carriage. The carriage is urged to the guide rails by its own weight, and slides along the guide rails.

However, if a force exceeding the urging force is applied to the carriage by vibrations, the carriage may be displaced with a tracking-off state and a focusing-off state. In order to resolve this problem, various methods have been proposed for increasing the urging force to the carriage against the guide rails.

For example, Japanese Unexamined Patent Publication No. Hei 6-103586 discloses a method for increasing the urging force, as is shown in FIG. 6A, by an attractive force between a base made of magnetic material and a magnet attached to the bottom of the carriage.

Japanese Unexamined Patent Publication No. Hei 2-273383 and Hei 3-5971 discloses a method for increasing the urging force, as is shown in FIG. 6B, by an attractive force between a magnet mounted on the carriage and guide rails made of magnetic material.

Japanese Unexamined Patent Publication No. Hei 4-82059 discloses a method for increasing the urging force by an attractive force between a magnet constituting a magnetic circuit for driving the carriage and magnetic material included in the carriage.

Japanese Unexamined Patent Publication No. Hei 7-66514 discloses a method for increasing the urging force by attractive force between a magnet constituting a magnetic circuit mounted on the carriage and guide rails made of magnetic material.

Instead of increasing the urging force by using the attractive force of the magnets, the urging force to the carriage against the guide rails may be so adjusted as to weaken the urging force by using a repulsive force of the magnets to reduce friction by sliding of the carriage. As a result, a moving speed of the carriage can be increased and the power required to drive the carriage can be reduced.

As is described above, in accordance with the design conditions for the optical disk drive, the urging force to the carriage against guide rails must be adjusted.

However, as is disclosed in the prior art, a special mechanism is required to adjust the urging force: a new component (e.g., a magnet) must be added, or a special material must be used for a component (e.g., guide rails and/or a carriage must be made of a magnetic material). Those cause manufacturing costs and the weight of the optical disk drive to increase.

SUMMARY OF THE INVENTION

It is, therefore, one objective of the present invention to provide an optical disk drive which can adjust the urging force to the carriage against the guide rails without a special mechanism being required.

To achieve the above objective, according to a first aspect of the present invention, there is provided 1. An optical disk drive for accessing an optical disk on which information is recorded at least optically by irradiating a light beam to the optical disk, comprising:

a carriage mounting a lens for guiding the light beam to the optical disk and moving in a track crossing direction of the optical disk;

a base having guide rails for guiding said carriage in the track crossing direction;

a first magnet attached to said base;

a first coil generating a force to drive said carriage along said guide rails by the magnetic field of said first magnet;

a second magnet attached to said carriage with shifting perpendicularly relative to said first magnet; and a second coil generating a force to drive the lens in a light axial direction by the magnetic field of said second magnet.

With the first arrangement, since the force having a perpendicular element is generated between the first magnet and the second magnet, the urging force to the carriage against the guide rails can be adjusted.

The first magnet and the second magnet are so arranged as to generate a perpendicular attractive force. Thus, the urging force can be increased and vibration of the carriage can be restricted.

Further, the first magnet and the second magnet are so arranged as to generate a perpendicular repulsive force. Thus, the urging force can be reduced, so that the speed at which the carriage is moved is increased, and the power consumed to drive the carriage is reduced.

To achieve the above object, according to a second aspect of the present invention, there is provided an optical disk drive for accessing an optical disk on which information is recorded at least optically by irradiating a light beam to the optical disk, comprising:

a carriage mounting a lens for guiding the light beam to the optical disk and moving in a track crossing direction of the optical disk;

a base having guide rails for guiding said carriage in the track crossing direction;

a first magnet attached to said base;

a first coil generating a force to drive said carriage along said guide rails by the magnetic field of said first magnet;

a second magnet attached to said carriage with shifting perpendicularly relative to said first magnet; and a second coil generating a force to drive the lens in a light axial direction by the magnetic field of said second magnet, wherein one of the polarities of said first and second magnets is perpendicularly symmetrical in the center portion and the other polarity is perpendicularly asymmetrical.

With the second arrangement, since the force having a perpendicular element is generated between the first and the second magnets, the urging force to the carriage against the guide rails can be adjusted.

DETAILED DESCRIPTION OF THE PREFERRED EMBODIMENT

The preferred embodiment of the present invention will now be described. It should be noted, however, that the technical scope of the present invention is not limited to this embodiment.

Figure 1:
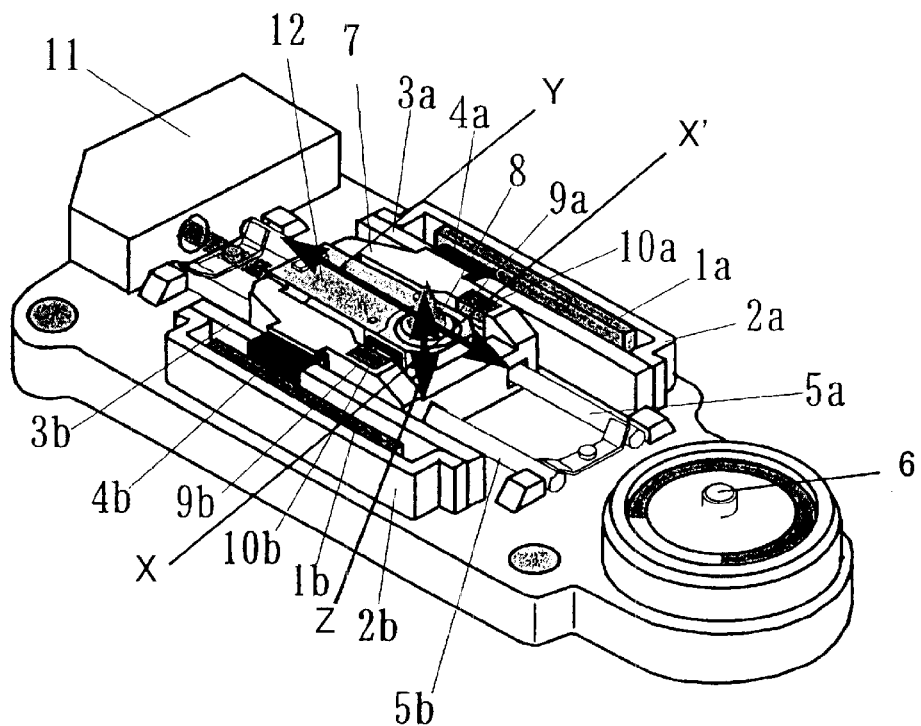
FIG. 1 is a perspective view of a carriage driver in an optical disk drive according to one embodiment of the present invention.

FIG. 1 is a perspective view of a carriage driver in an optical disk drive according to one embodiment of the present invention. In FIG. 1, a carriage 7 moves along two parallel guide rails 5a and 5b in a track crossing direction of the optical disk (seek direction indicated by an arrow Y). The carriage 7 is driven by a magnetic circuit which is constituted by magnets for seeking 1a and 1b, external yokes 2a and 2b and internal yokes 3a and 3b, all of which are fixed to a base 11, and seeking coils 4a and 4b fixed to the carriage 7. An optical disk (not shown) is loaded above a spindle motor 6, and is spun at a predetermined rotational speed.

A lens 8, connected to the carriage 7 via a parallel leaf spring 12, can be moved in a light axial direction (the focusing direction indicated by an arrow Z). The lens 8 is driven by magnets for focusing 10a and 10b mounted on the carriage 7, and focusing coils 9a and 9b fixed to the lens 8.

For the carriage driver of the thus arranged optical disk drive of this embodiment, the magnets for seeking 1a and 1b fixed to the base 11, and the magnets for focusing 10a and 10b fixed to the carriage 7, are so arranged that they are shifted perpendicularly relative to each other, and the strength of an urging force can be adjusted by generating a perpendicular force between the magnet for seeking 1a, 1b and magnet for focusing 10a, 10b.

Figure 2:
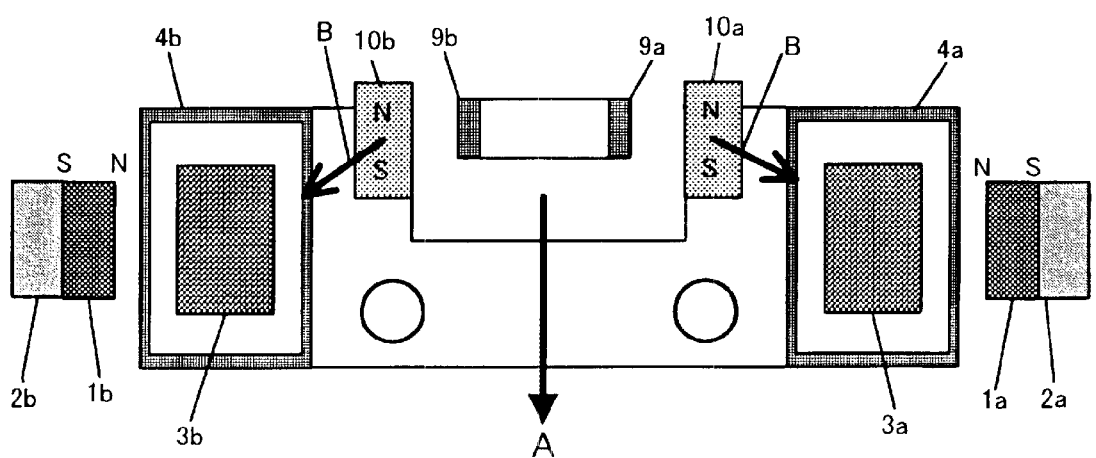
FIG. 2 is a cross-sectional view taken along the line X–X' in FIG. 1 to provide a first example of the seeking and magnet for focusing arrangement.

In FIG. 2, a cross-sectional view taken along the line X–X' in FIG. 1 is a first example of an arrangement employed for the magnets for seeking 1a and 1b and the magnets for focusing 10a and 10b. In FIG. 2, the magnets for focusing 10a and 10b are shifted perpendicularly relative to the magnets for seeking 1a and 1b, and are so arranged higher than the magnets for seeking 1a and 1b. For example, in case that the magnets for seeking 1a and 1b are so arranged that for each of them the inner polarity is N and the outer polarity is S, the magnets for focusing 10a and 10b are so arranged that for each of them the upper polarity is N and the lower polarity is S. The internal yokes 3a and 3b, which are so arranged that they are at substantially the-same height as the magnets for seeking 1a and 1b, are magnetized by the magnetic fields of the magnets for seeking 1a and 1b, so that the polarity of their inner sides is N and the polarity of their outer sides is S. Therefore, since the inner N poles of the magnets for seeking 1a and 1b attract the lower S poles of the magnets for focusing 10a and 10b, an attractive force B having a downward perpendicular force element A is generated.

The downward perpendicular force element A of the attractive force B serves to increase the strength of the urging force to the carriage 7 against the guide rails 5a and 5b. That is, since the downward perpendicular force element A, same as the gravity of the carriage 7, serves as the force which urges the carriage 7 against the guide rails, the urging force applied to the carriage 7 relative to the guide rails 5a and 5b can be increased, and vibration of the carriage 7 can be restricted.

Figure 3:
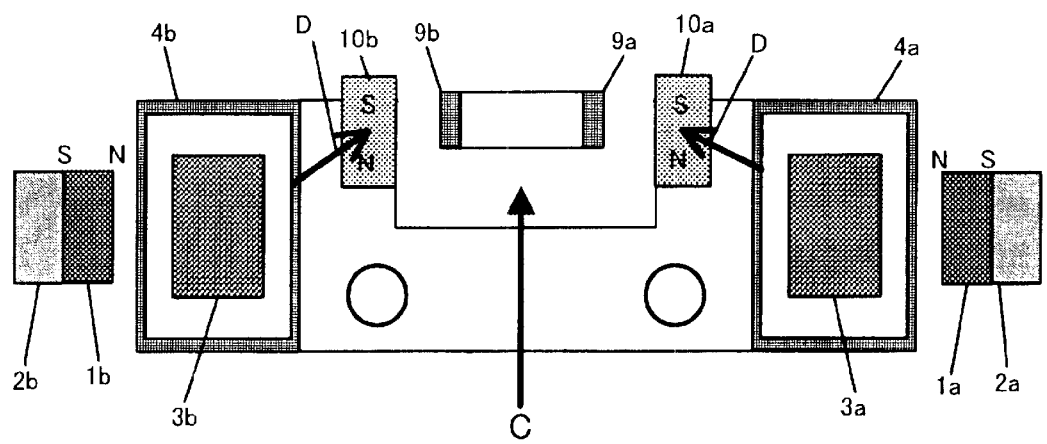
FIG. 3 is a cross-sectional view taken along the line X–X' in FIG. 1 to provide a second example of the seeking and magnet for focusing arrangement.

FIG. 3 is a cross-sectional view taken along the line X–X' in FIG. 1 to provide a second example arrangement of the magnets for seeking 1a and 1b and the magnets for focusing 10a and 10b. In FIG. 3, as in FIG. 2, the magnets for focusing 10a and 10b are perpendicularly shifted relative to the magnets for seeking 1a and 1b, and are so arranged higher than the magnets for seeking 1a and 1b. In case that, as in FIG. 2, the magnets for seeking 1a and 1b are so arranged, for example, that their inner polarity is N and their outer polarity is S, the magnets for focusing 10a and 10b are so arranged that the polarity of their upper sides is S and the polarity of their lower sides is N. The internal yokes 3a and 3b, which are arranged substantially at the same height as are the magnets for seeking 1a and 1b, are magnetized by the magnetic fields of the magnets for seeking 1a and 1b, so that the polarity of their inner sides is N and the polarity of their outer sides is S. Therefore, since the inner N polarities of the magnets for seeking 1a and 1b repulse the lower N polarities of the magnets for focusing 10a and 10b, a repulsive force D having an upward perpendicular element C is generated.

The upward urging perpendicular force element C of the repulsive force D acts to reduce the urging force applied to the carriage 7 against the guide rails 5a and 5b. That is, since a direction of the upward perpendicular element C is opposite to that of the urging force, the element C reduces the strength of the urging force induced by the gravity of the carriage 7, the friction between the carriage 7 and the guide rails 5a and 5b can be reduced, and the carriage 7 can be moved at a high speed with lower power consumption.

The polarities and arrangements of the magnets for seeking 1a and 1b and the magnets for focusing 10a and 10b are not limited to those in this embodiment. Specifically, so long as the directions for driving the carriage 7 and the lens 8, which are determined by the direction of the magnetic field and the current flowing across the coils, are respectively ensured as the track crossing direction and the light axial direction, polarities and arrangements differing from those in this embodiment may be employed in order to generate, between the magnets for seeking 1a and 1b and the magnets for focusing 10a and 10b, the attractive force B or the repulsive force D, which have either the perpendicular element A or C.

For example, the magnets for seeking 1a and 1b may be arranged so that their inner polarity is S and their outer polarity is N. In this case, the polarities of the magnets for focusing 10a and 10b are the opposite of those in the above embodiment. That is, to generate the attractive force (FIG. 2), the upper sides of the magnets for focusing 10a and 10b must be set to the S polarity, and the lower sides must be set to the N polarity. To generate the repulsive force, the upper sides of the magnets for focusing 10a and 10b must be set to the N polarity, and the lower sides must be set to the S polarity. In addition, the seek magnets 1a and 1b can be so arranged that their polarities are set in directions that differ from those of the upper and the lower sides of the magnets for focusing 10a and 10b. Further, the magnets for focusing 10a and 10b can be so arranged that their polarities are set in directions that differ for the inner and the outer sides.

Figure 4:
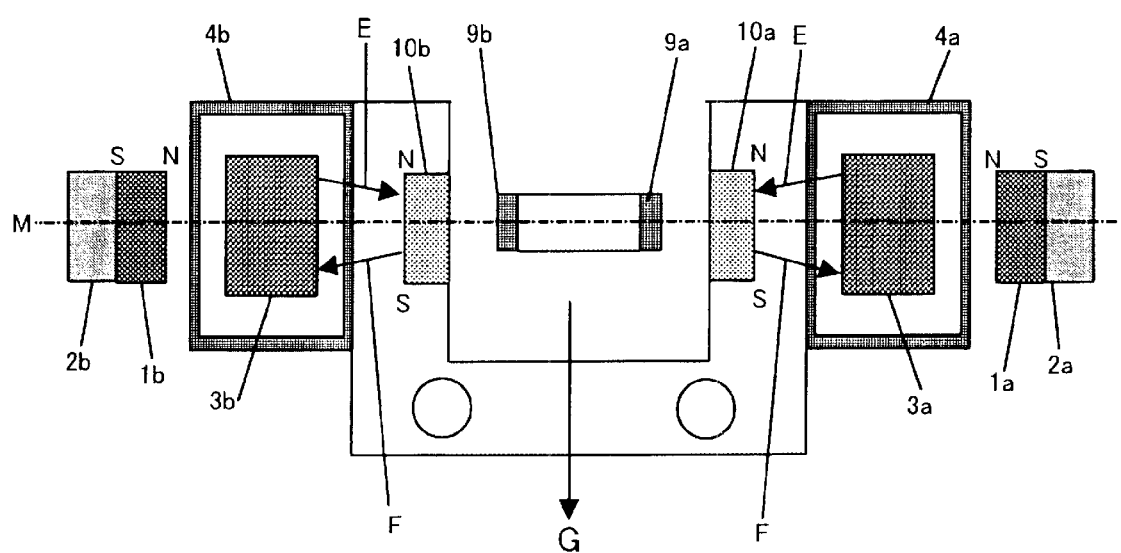
FIG. 4 is a cross-sectional view taken along the line X–X' in FIG. 1 to provide a third example of the seeking and magnet for focusing arrangement.

FIG. 4 is a cross-sectional view taken along the line X–X' in FIG. 1 to provide a third example of the arrangement of the magnets for seeking 1a and 1b and the magnets for focusing 10a and 10b. In FIG. 4, the magnets for focusing 10a and 10b and the magnets for seeking 1a and 1b are so arranged that they are not perpendicularly shifted relative to the others, i.e., so that each center position of those magnets in perpendicular direction is substantially same height at a center line M. The magnets for seeking 1a and 1b are so arranged that their polarities are symmetrical perpendicular to the center line M (the directions of the polarities are left and right in FIG. 4). The magnets for focusing 10a and 10b are so arranged that the polarities are asymmetrical with respect to the center line M in perpendicular direction (the directions of the polarities are upward and downward in FIG. 4). Specifically, in FIG. 4, the magnets for seeking 1a and 1b are arranged so that the polarity of the inner sides is N and the polarity of the outer sides is S, and the magnets for focusing 10a and 10b are so arranged that the polarity of the upper sides are N and the polarity of the lower sides is S.

The internal yokes 3a and 3b, which are arranged substantially at the same height as the magnets for seeking 1a and 1b are magnetized by the magnetic fields of the magnets for seeking 1a and 1b, so that the polarity of their inner sides is N and the polarity of their outer sides is S. Therefore, in the portion above the center line M, the repulsive force E is generated, via the internal yokes 3a and 3b, between the inner N poles of the magnets for seeking 1a and 1b and the upper N poles of the magnets for focusing 10a and 10b. In the portion below the center line M, the attractive force F is generated between the inner N poles of the magnets for seeking 1a and 1b and the lower S poles of the magnets for focusing 10a and 10b.

Since the repulsive force E and the attractive force F, which face in the opposite directions, are generated, the perpendicular combined force occurs. In FIG. 4, the perpendicular downward combined force G is generated. Therefore, the combined force G serves as a force for increasing the urging force of the carriage 7 against the guide rails 5a and 5b.

Figure 5:
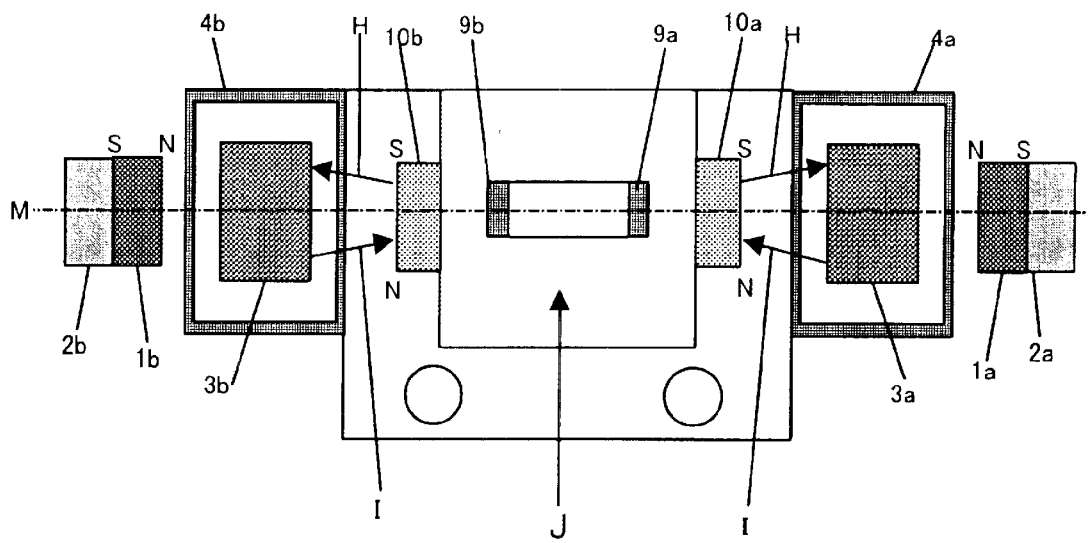
FIG. 5 is a cross-sectional view taken along the line X–X' in FIG. 1 to provide a fourth example of the seeking and magnet for focusing arrangement.
Figure 6A:
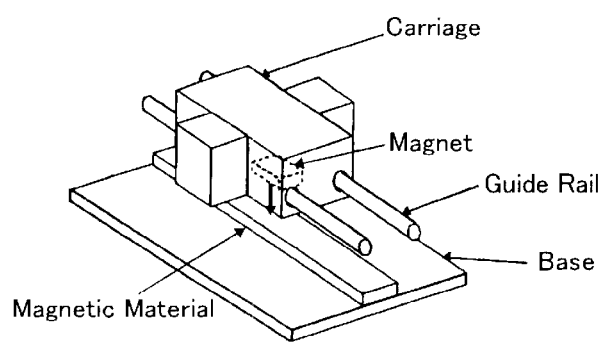
FIGS. 6A and 6B are diagrams for explaining a conventional pressure application method.
Figure 6B:
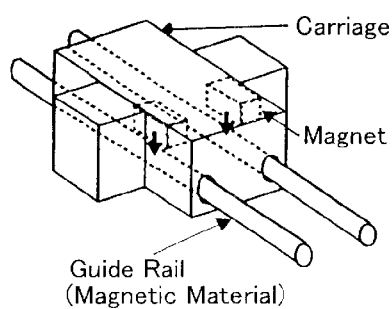

FIG. 5 is a cross-sectional view taken along the line X–X' in FIG. 1 to provide a fourth example of the arrangement of the magnets for seeking 1a and 1b and the magnets for focusing 10a and 10b. In FIG. 5, the polarities of the magnets for focusing 10a and 10b are the opposite of those in FIG. 4. That is, the magnets for focusing 10a and 10b are so arranged that the polarity of their upper sides is S and the polarity of their lower sides is N.

As is apparent from FIG. 5, contrary to the arrangement in FIG. 4, the attractive force H is generated in the portion above the center line M, while the repulsive force I is generated below the center line M, so that the combined perpendicularly upward force J is generated. The upward perpendicular combined force J serves as a force for reducing the urging force of the carriage 7 against the guide rails 5a and 5b.

The same perpendicular force can be generated by setting the polarities of the magnets for seeking 1a and 1b so that perpendicular to the center line M they are asymmetrical, and by setting the polarities of the magnets for focusing 10a and 10b so that perpendicular to the center line M they are symmetrical.

As is described above, even when the magnets for seeking 1a and 1b and the magnets for focusing 10a and 10b are not shifted perpendicularly, since one polarity is so set that perpendicular to the center line M it is asymmetrical, and the other polarity is set so that perpendicular to the center line M it is symmetrical, forces exerted in opposite directions are generated in the portions above and below the center line M, and the perpendicular force can be generated by combining these forces.

Although preferably the center positions of the magnets for seeking 1a and 1b are at the same height as are those of the magnets for focusing 10a and 10b, they may be slightly shifted perpendicularly within a height range wherein forces in opposite directions are generated between the magnets for seeking 1a and 1b and the magnets for focusing 10a and 10b.

In the above example arrangements, the magnets for focusing 10a and 10b and the internal yokes 3a and 3b, which are magnetized by the magnets for seeking 1a and 1b are so arranged that they are close enough to generate an effective attraction force or repulsive force.

The optical disk of the present invention may include an optical disk, such as a CD-ROM or a CD-R, a magneto-optical disk (MO), or a phase-change disk.

According to the present invention, the magnets for seeking provided for the base, and the magnets for focusing provided for the carriage are so arranged that they are shifted perpendicularly relative to each other. With this arrangement, since the attractive force or the repulsive force, which includes a perpendicular element, is generated between the magnets for seeking and the magnets for focusing, the urging force of the carriage against the guide rails can be adjusted.

Even when the magnets for seeking and the magnets for focusing are portioned without any perpendicular shifting, the perpendicular force is generated by setting one polarity asymmetrically perpendicular to the center position, and by setting the other polarity symmetrically perpendicular to the center position. As a result, the urging force of the carriage against the guide rails can be adjusted.

What is claimed is:

1. An optical disk drive for accessing an optical disk on which information is read at least optically by irradiating a light beam to the optical disk, comprising:
    a carriage mounting a lens for guiding the light beam to the optical disk and moving in a track crossing direction of the optical disk;
    a base having guide rails for guiding said carriage in the track crossing direction;
    a first magnet attached to said base;
    a first coil generating a force to drive said carriage along said guide rails by the magnetic field of said first magnet;
    a second magnet attached to said carriage such that it can be shifted perpendicularly relative to said first magnet; and
    a second coil generating a force to drive the lens in a light axial direction by the magnetic field of said second magnet;
    wherein said first and second magnets are positioned relative to each other such that a perpendicular attractive force between said first and second magnets is generated.

2. An optical disk drive according to claim 1, wherein said first and second magnets are positioned relative to each other such that a perpendicular repulsive force between said first and second magnets is generated.

3. An optical disk drive for accessing an optical disk on which information is read at least optically by irradiating a light beam to the optical disk, comprising:

a carriage mounting a lens for guiding the light beam to the optical disk and moving in a track crossing direction of the optical disk;

a base having guide rails for guiding said carriage in the track crossing direction;

a first magnet attached to said base;

a first coil generating a force to drive said carriage along said guide rails by the magnetic field of said first magnet;

a second magnet attached to said carriage; and a second coil generating a force to drive the lens in a light axial direction by the magnetic field of said second magnet, wherein one of said first and second magnets has a horizontal polarity direction and the other has a perpendicular polarity direction to generate a first force at a first height in a perpendicular direction and a second force at a second height different from the first height between said first and second magnets, the first force being an attractive force or a repulsive force and the second force being opposite force of the first force.

4. The optical disk drive according to claim 3, wherein center lines in a horizontal direction of said first and second magnets are substantially at the same height in the perpendicular direction.

5. The optical disk drive according to claim 3, wherein said first and second magnets are positioned relative to each other such that a perpendicular downward force by the first force and the second force is generated.

6. The optical disk drive according to claim 3, wherein said first and second magnets are positioned relative to each other such that a perpendicular upward force by the first force and the second force is generated.

* * * * *